United States Patent
Zhang et al.

(10) Patent No.: US 10,057,836 B2
(45) Date of Patent: Aug. 21, 2018

(54) SMALLCELL AND OPERATING METHOD THEREOF

(71) Applicant: Sercomm Corporation, Taipei (TW)

(72) Inventors: Yuan Zhang, Jiangsu Province (CN); Ling Zhu, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 41 days.

(21) Appl. No.: 15/156,595

(22) Filed: May 17, 2016

(65) Prior Publication Data
US 2017/0070936 A1 Mar. 9, 2017

(30) Foreign Application Priority Data
Sep. 9, 2015 (CN) .......................... 2015 1 0570938

(51) Int. Cl.
*H04W 36/30* (2009.01)
*H04W 48/02* (2009.01)
*H04W 8/18* (2009.01)
*H04W 52/04* (2009.01)
*H04W 84/04* (2009.01)

(52) U.S. Cl.
CPC ............ *H04W 48/02* (2013.01); *H04W 8/186* (2013.01); *H04W 52/04* (2013.01); *H04W 84/045* (2013.01)

(58) Field of Classification Search
CPC ..... H04W 48/02; H04W 8/186; H04W 52/04; H04W 52/042
See application file for complete search history.

(56) References Cited

U.S. PATENT DOCUMENTS

| 8,700,083 | B2 | 4/2014 | Yavuz et al. |
| 8,761,753 | B2 | 6/2014 | Meshkati et al. |
| 8,874,101 | B2 | 10/2014 | Lau |
| 8,879,400 | B2 | 11/2014 | Koike et al. |
| 8,929,881 | B2 | 1/2015 | Sato et al. |
| 8,976,690 | B2 * | 3/2015 | Akyildiz ............. H04L 41/5025 370/252 |
| 8,983,521 | B2 | 3/2015 | Zhu |
| 9,210,586 | B2 | 12/2015 | Catovic et al. |
| 9,294,925 | B2 | 3/2016 | Nakamura |

(Continued)

FOREIGN PATENT DOCUMENTS

| CN | 101772066 A | 7/2010 |
| CN | 102111781 A | 6/2011 |

(Continued)

OTHER PUBLICATIONS

"Universal Mobile Telecommunications System (UMTS); Radio Resource Control (RRC); Protocol specification"; (3GPP TS 25.331 version 5.24.0 Release 5); ETSI TS 125 331 V5.24.0 (Jul. 2009); pp. 1-1046.

(Continued)

*Primary Examiner* — Jamal Javaid
(74) *Attorney, Agent, or Firm* — McClure, Qualey & Rodack, LLP

(57) ABSTRACT

A smallcell and an operating method thereof are provided. The operating method of the small cell includes the following steps: a signal status is acquired from a set of user equipments (UEs) in the coverage area of the smallcell; at least one target UE is selected from the set of UEs according to the signal status.

16 Claims, 5 Drawing Sheets

(56) References Cited

U.S. PATENT DOCUMENTS

| | | | |
|---|---|---|---|
| 2009/0042595 A1 | 2/2009 | Yavuz et al. | |
| 2009/0042596 A1 | 2/2009 | Yavuz et al. | |
| 2009/0279519 A1* | 11/2009 | Brisebois | H04W 52/242 370/338 |
| 2010/0210268 A1* | 8/2010 | Lim | H04W 36/04 455/436 |
| 2010/0284303 A1 | 11/2010 | Catovic et al. | |
| 2013/0023299 A1 | 1/2013 | Nakamura | |
| 2013/0273934 A1 | 10/2013 | Meredith et al. | |
| 2014/0018115 A1* | 1/2014 | Zhuang | H04B 7/024 455/501 |
| 2014/0113638 A1 | 4/2014 | Zhang et al. | |
| 2014/0187255 A1* | 7/2014 | Dimou | H04W 72/082 455/452.2 |
| 2014/0329551 A1* | 11/2014 | Ryoo | H04W 76/046 455/522 |
| 2015/0350923 A1 | 12/2015 | Wang et al. | |

FOREIGN PATENT DOCUMENTS

| | | |
|---|---|---|
| CN | 102405675 A | 4/2012 |
| CN | 102422665 A | 4/2012 |
| CN | 102802185 A | 11/2012 |
| CN | 102812741 A | 12/2012 |
| CN | 102823304 A | 12/2012 |
| CN | 102835168 A | 12/2012 |
| CN | 102958150 A | 3/2013 |
| CN | 103052081 A | 4/2013 |
| CN | 103533554 A | 1/2014 |
| CN | 103581995 A | 2/2014 |
| CN | 104320817 A | 1/2015 |
| CN | 104320817 A | 1/2015 |

OTHER PUBLICATIONS

"LTE; Evolved Universal Terrestrial Radio Access (E-UTRA); Radio Resource Control (RRC); Protocol specification (3GPP TS 36.331 version 9.18.0 Release 9)"; (Jul. 2014); pp. 1-268.

CN Office Action dated Jan. 3, 2018 in Chinese application (No. 201510523642.4).

CN Office Action dated Apr. 4, 2018 in Chinese application (No. 201510570938.1).

\* cited by examiner

SMALLCELL AND OPERATING METHOD THEREOF

This application claims the benefit of People's Republic of China application Serial No. 201510570938.1, filed Sep. 9, 2015, the disclosure of which is incorporated by reference herein in its entirety.

TECHNICAL FIELD

The disclosure relates in general to a smallcell and an operating method thereof, especially to a smallcell and an operating method thereof capable of identifying a target user equipment (UE) from a set of UEs.

BACKGROUND

Wireless communication base stations can be categorized into macrocells and smallcells by their service coverage areas. Smallcells can be further categorized into picocells and femtocells, etc. Typically, smallcells are usually deployed indoor, to provide services for areas difficult for macrocells to properly cover. However, the operating environments may vary greatly for smallcells deployed in different sites. For example, both the domestic size of user's house and the deployment location of station can affect the coverage area of a smallcell.

Furthermore, considering the difficulty of deploying smallcells and the cost of operators, usually, a smallcell may not be set-up like a closed subscriber group (CSG) smallcell that is accessible only for specific users. Hence, in general, a smallcell is unable to identify its primary users (e.g., family member users) and optimize its transmitting power.

Therefore, there is a need to provide a smallcell and an operating method thereof capable of identifying the primary users in an easy and low-cost way.

SUMMARY

One of the purposes of the present invention is to provide a smallcell and an operating method thereof, which can identify a target UE from a set of UEs.

According to an embodiment of the present invention, an operating method of a small cell is provided. The operating method includes the following steps: a signal status is acquired from a set of UEs stationed in the coverage area of the smallcell; at least one target UE is selected from the set of UEs according to the signal status.

According to an embodiment of the present invention, a smallcell is provided, wherein the smallcell serves a set of UEs within its coverage area. The smallcell includes a receive module and an identification module. The receive module is used for acquiring a signal status from a set of UEs. The identification module is used for selecting at least one target UE from the set of UEs according to the signal status.

Figure 1:
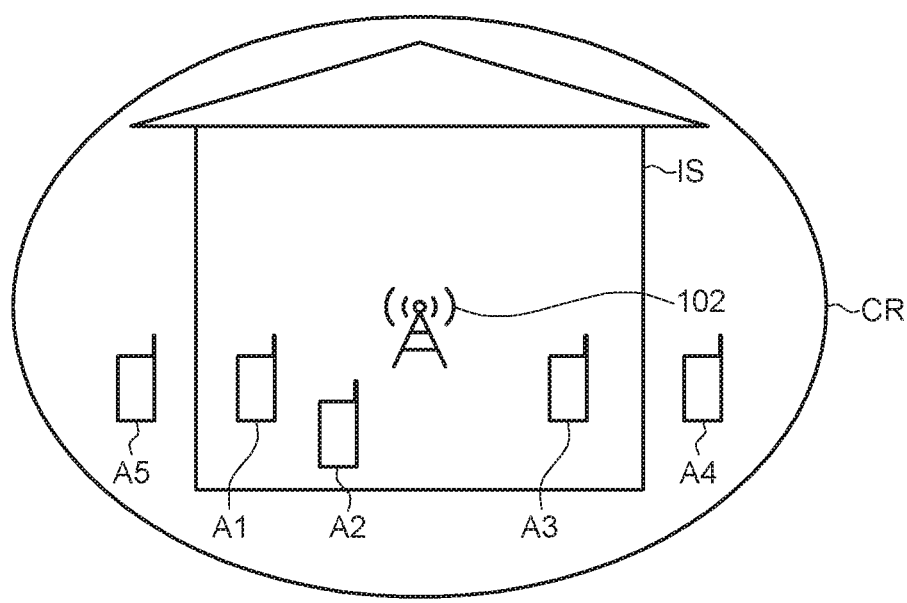
FIG. 1 illustrates a schematic network configuration according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the following detailed description, for purposes of explanation. numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates a schematic network configuration according to an embodiment of the present invention. The network configuration includes a smallcell 102 and a plurality of user equipments (UEs) A1-A5. The UEs A1-A5 are in the coverage area CR of the smallcell 102, and can be regarded together as a set of UEs. The smallcell 102, such as a picocell or a femtocell, may provide network service in a small area. As shown in FIG. 1, the smallcell 102 is placed in an indoor space IS, and is mainly responsible for providing family member users (such as UEs A1-A3) with network service. Understandably, although FIG. 1 is exemplified by five UEs A1-A5, the present invention is not limited thereto. The number of UEs in the coverage area CR of the smallcell 102 may be arbitrary, depending on the application scenarios. Further, the deployment location of the smallcell 102 can also be arbitrary, and not limited to be placed in the indoor space IS.

In the example of FIG. 1, the coverage area CR of the smallcell 102 expands to an outdoor area, therefore, except the UEs A1-A3 located in the indoor space IS, other non-family member users (such as UEs A4 and A5) located in the coverage area CR may also access the network resource through the smallcell 102.

According to the definition of 3rd Generation Partnership Project (3GPP), an UE served by a femtocell is generally called Home User Equipment (HUE). Typically, a femtocell can be set with appropriate transmitting power through on-site manual measurements. However, the power set by the abovementioned scheme is usually not ideal, since that users may have different habits and that the relative location between a ferntocell and a user may vary. In addition, the reason for deploying smallcells in homes or other indoor spaces is generally to serve users located therein. If all UEs in the coverage area of a femtocell are managed in the same hierarchy, the femtocell will be unable to appropriately optimize for the primary users (such as the family member UEs A1-A3 shown in FIG. 1).

According to the present invention, a smallcell may identify at least one target UE (the primary users of the smallcell, such as family member users) from a set of UEs (e.g., a set of HUEs) according to a signal status collected therefrom, and perform corresponding optimizations to ensure the network quality of service of the target UEs.

Figure 2A:
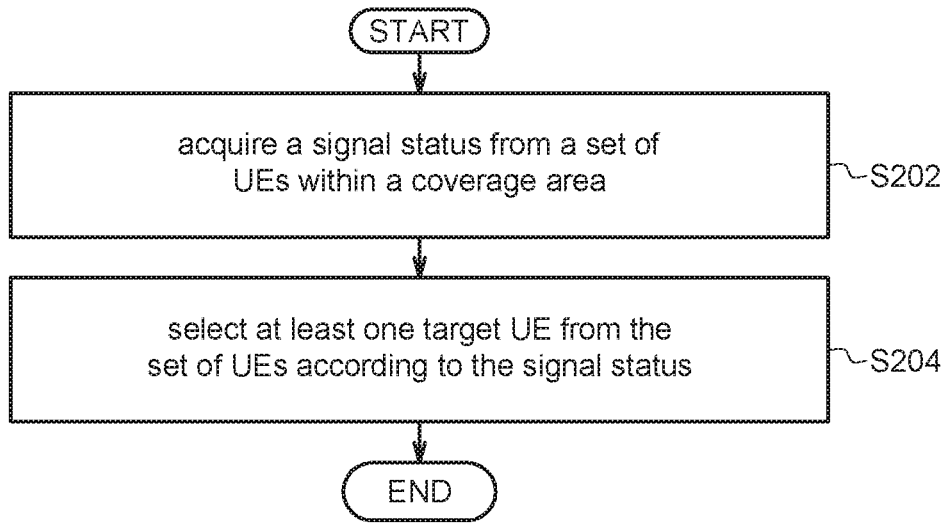
FIG. 2(a) shows a flowchart of an operating method of a smallcell according to an embodiment of the present invention.

FIG. 2(a) shows a flowchart of an operating method of a smallcell according to an embodiment of the present invention. In step S202, the smallcell acquires a signal status from a set of UEs within its coverage area. The signal status includes, for example, at least one of path loss information, signal quality, and signal strength. Then, in step S204, the smallcell selects at least one target UE from the set of UEs according to the signal status. For example, the smallcell may select an UE from the set of UEs as the target UE, wherein the signal status of the selected UE is equal to or better than a threshold. For example, the smallcell may select an UE that has path loss smaller than a threshold as the target UE, select an UE that has signal quality better than a threshold as the target UE, and/or select an UE that has signal strength better than a threshold as the target UE.

Figure 2B:
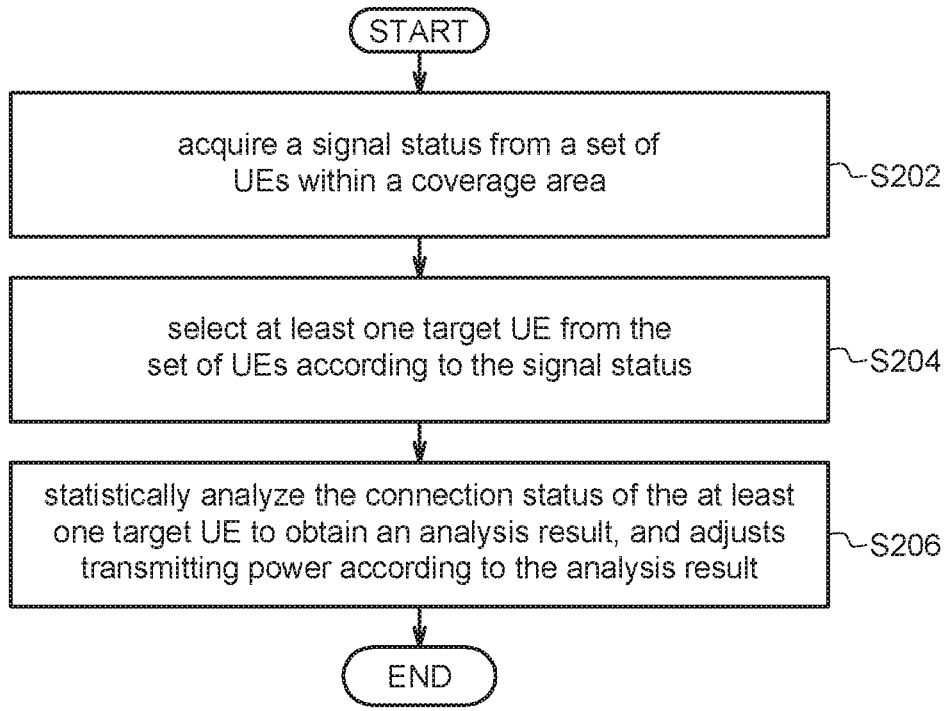
FIG. 2(b) shows a flowchart of an operating method of a smallcell according to an embodiment of the present invention.

FIG. 2(b) shows a flowchart of an operating method of a smallcell according to an embodiment of the present invention. In this embodiment, after identifying the target UE, the smallcell may further execute optimization schemes, such as adjusting the transmitting power. As shown in FIG. 2(b), after the flow of FIG. 2(a) is executed, step S206 is then executed. In step S206, the smallcell statistically analyzes the connection status of the at least one target UE to obtain an analysis result, and adjusts the transmitting power according to the analysis result. The connection status of target UE can be described by various network measurement data of the target UE, such as the number of failure connections, data traffic, duration of stay, and frequency of stay.

It is understood that after identifying the target UE, the smallcell is not limited to optimizing its transmitting power. The smallcell may perform optimizations in other forms according to the statistical information.

As described above, the signal status that the smallcell used to identify the target UE includes at least one of path loss information, signal quality, and signal strength. Taking path loss information as example, generally, when the smallcell is placed in a house, only family members moving inside the house are likely to be near the smallcell, so the measured path loss will be relatively small. As for the non-family members, they are less likely to be near the smallcell, and hence, the measured path loss will be always relatively large. By using such characteristic, the smallcell is able to determine whether an UE is a family member according to the path loss information of the UE (or other forms of signal status), without deploying high-cost CSG smallcell or using other schemes of limited access to manage the access of family/non-family member users.

Figure 3:
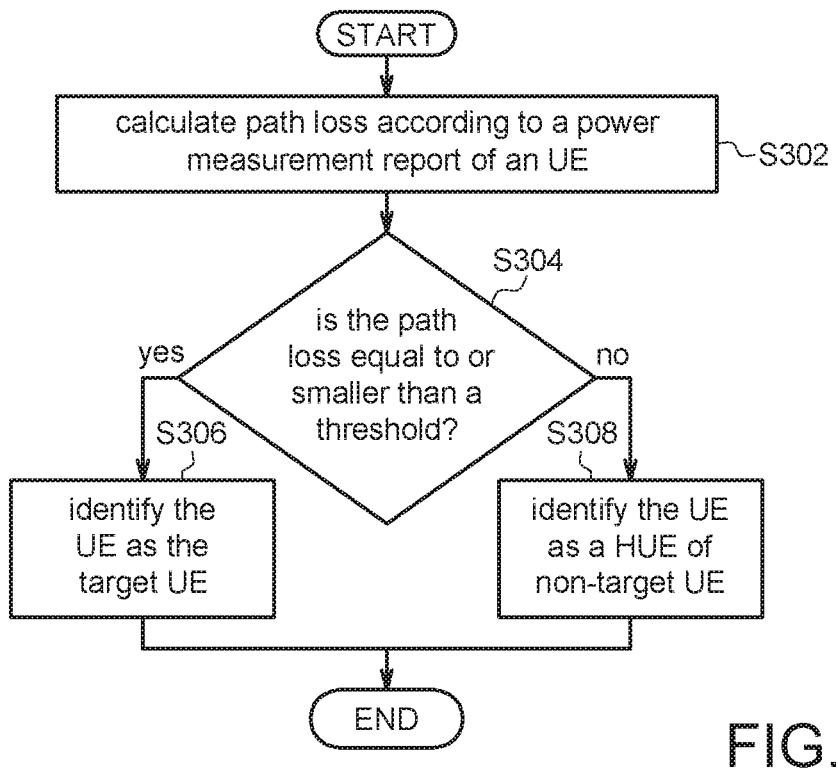
FIG. 3 shows an example of a flowchart for determining whether an UE is a target UE according to the path loss of the UE.

FIG. 3 shows an example of a flowchart for determining whether an UE is a target UE according to the path loss of the UE. In step S302, a smallcell calculates its path loss according to a power measurement report of the UE. In step S304, the smallcell determines whether the path loss is equal to or smaller than a threshold. If the result is positive, the flow proceeds to step S306, and the smallcell identifies the UE as the target UE. If the result is negative, the flow proceeds to step S308, and the smallcell identifies the UE as a HUE of non-target UE. The mechanism of using signal quality and/or signal strength of the UE to identify the target UE is similar to the flow described above, and hence it will not be further elaborated.

In an embodiment, the UE may send the power measurement report to the smallcell during a period from the establishment time of a Radio Resource Control (RRC) connection with the smallcell to the RRC connection time. Meanwhile, as the path loss is equal to or smaller than a threshold, the smallcell may consider the UE as the target UE. For example, after the UE establishes the RRC connection with the smallcell, the UE may report the power measurement report to the smallcell periodically or when an event triggers the UE to report. The power measurement report can be provided to the smallcell to determine whether the UE is the target UE. The magnitude of the threshold can be determined by, for example, signal loss through walls and/or distances between users and smallcell, e.g., 60 dB, but the present invention is not limited thereto.

Depending on the configuration of a communication system, the power measurement report reported by the UE can be realized by different ways, such as a Reference Signal Received Power (RSRP) report used in Long-Term Evolution (LTE) system, or a Received Signal Code Power (RSCP) report used in Universal Mobile Telecommunications System (UMTS).

For example, under LTE system, a smallcell may receive a RSRP report from an UE, and calculate the path loss of the UE according to the RSRP report, to determine whether the UE is a target UE. Alternatively, under UMTS system, a smallcell may calculate the path loss of an UE by using the UE's RSCP report. If the path loss is equal to or smaller than a threshold, the UE is considered as a target UE. Understandably, the present invention is not limited to the above examples. The power measurement report that an UE reports to a smallcell can be realized by different ways in accordance with the used communication system configuration.

In an embodiment, the coverage area of a smallcell can be divided into a plurality of regions by the strength of signal coverage, for a reference to determine a target UE.

Figure 4:
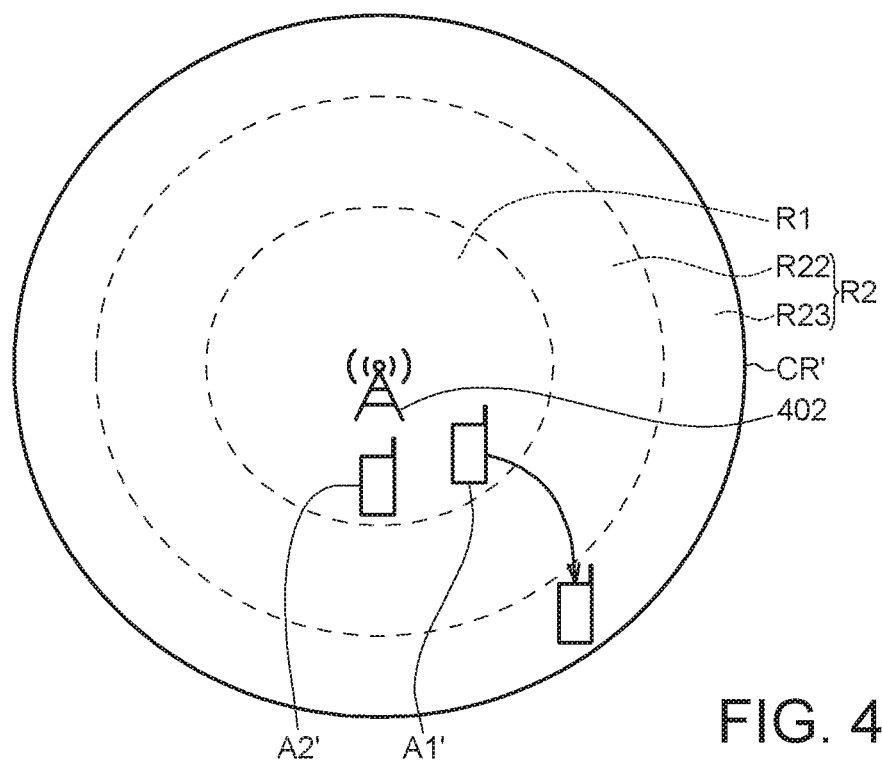
FIG. 4 illustrates a schematic coverage area of a smallcell which is divided into a plurality of regions according to an embodiment of the present invention.

FIG. 4 illustrates a schematic coverage area of a smallcell which is divided into a plurality of regions according to an embodiment of the present invention. As shown in FIG. 4, the coverage area CR' of the smallcell 402 includes a core region R1 and a non-core region R2, where the core region R1 has signal coverage strength larger than that of the non-core region R2. The stronger the signal coverage strength is, the smaller the path loss of an UE will be (e.g., smaller than a threshold), therefore, UEs in the core-region R1 may be considered as target UEs, like UEs A1' and A2' shown in this figure.

The non-core region R2 can be divided into one or more sub-regions. As shown in FIG. 4, the non-core region R2 further includes an intermediate region R22 and an edge region R23, where the signal coverage strength gets less as the distance from the smallcell 402 increases. In an embodiment, the smallcell 402 may determine which coverage area an UE is currently located based on the signal strength information reported by the UE.

In some cases, the target UE may move from the core region R1 to the non-core region R2, or, after an UE previously determined as the target UE is offline, the UE may re-initiate a connection to the smallcell 402 from the non-core region R2. To prevent misidentifying a family member user (e.g., target UE) as a non-family member user (e.g., non-target UE) or similar situations, in an embodiment, when the smallcell 402 determines an UE as the target UE, the smallcell 402 may store the UE's identity in a list for subsequent process of comparison and determination.

For example, after the smallcell 402 identifies the UE A1' as the target UE, the smallcell 402 may store the Temporary Mobile Subscriber Identity (TMSI) of the UE A1' which is used in the initiation of a RRC connection into a list. In this manner, when the UE A1' establishes a RRC connection to the smallcell 402 again, the smallcell 402 is able to identify the UE A1 as the target UE by using the stored TMSI, and is not required to execute the flow of FIG. 3 for the UE A1' again, so as to avoid misidentifying the UE A1' as a non-target UE.

In another embodiment, when the smallcell 402 identifies an UE as the target UE, the smallcell 402 may record the International Mobile Subscriber Identity (IMSI) of the UE, and, as the UE accesses the smallcell 402 again, the smallcell 402 may compare the IMSI to check whether the UE is the target UE. No matter what the recording approach is, as long as the smallcell 402 had identified the UE A1' as the target UE before, the smallcell 402 is not required to execute the flow of FIG. 3 for the UE A1' again, to avoid misidentifying the UE A1' as a non-target UE.

As described above, the target UE may be an UE currently in the core region R1, or an UE previously in the core region R1. Taking FIG. 4 as example, when the UE A1' is in the core region R1, the smallcell 402 may store the identity of the UE A1' in a list after identifying the UE A1' as the target UE by using the flow shown in FIG. 2. Afterwards, when the UE A1' moves from the core region RI to the non-core region R2 (e.g., the edge region R23), or directly initiates a connection to the smallcell 402 from the non-core region R2, the smallcell 402 may determine whether the UE A1' is the target UE according to the information in the list. In other words, the smallcell 402 may determine whether a device connected thereto is a target UE or not based on the list. Therefore, even if an UE of family member users accesses the smallcell from a non-core region, or if the measured path loss is larger than a threshold, the smallcell can still identify the UE as a target UE based on the list information.

Figure 5:
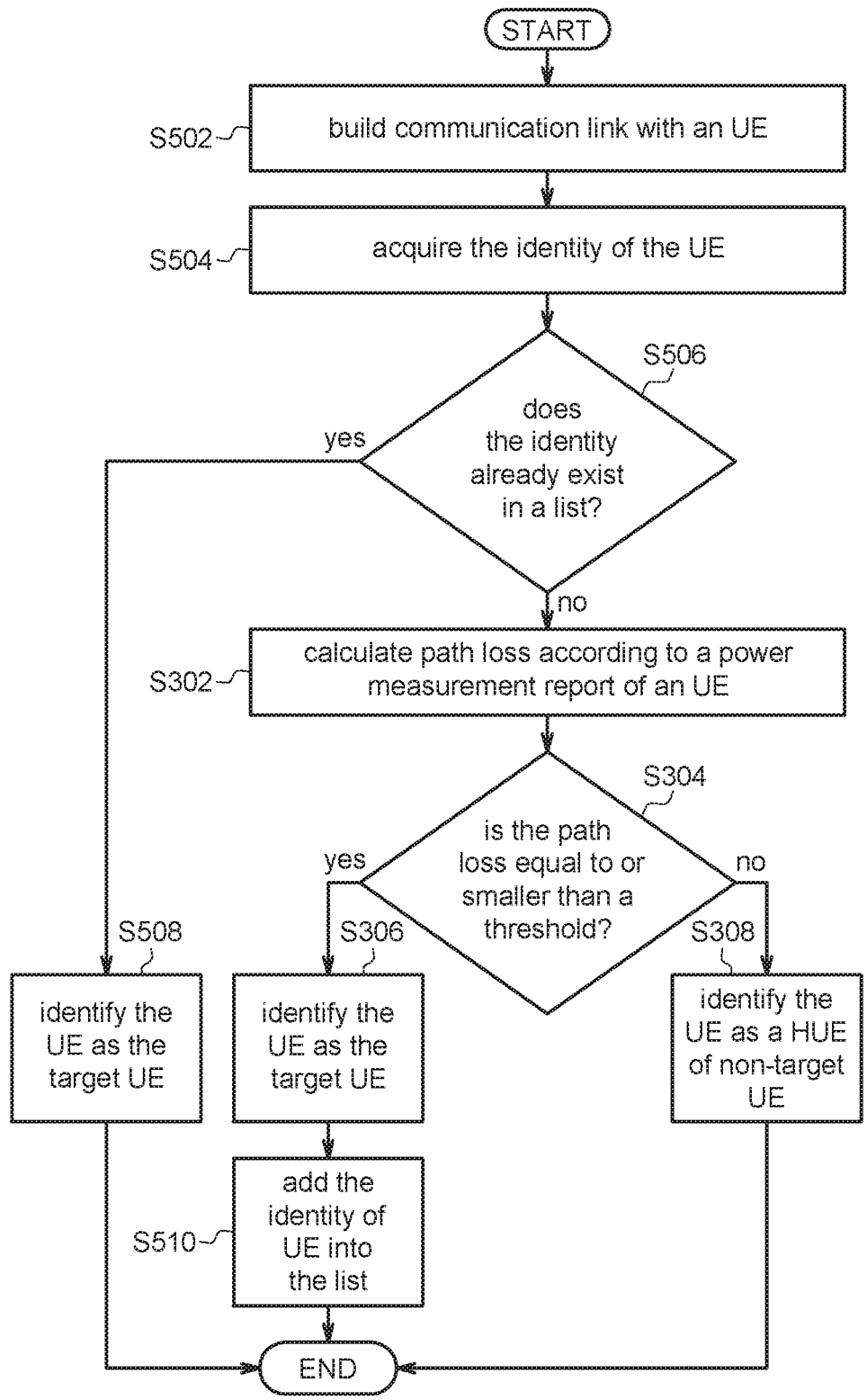
FIG. 5 shows an example of a flowchart for determining the target UE based on the identity of an UE according to an embodiment of the present invention.

FIG. 5 shows an example of a flowchart for identifying the target UE based on the identity of an UE according to an embodiment of the present invention. First, the smallcell may build communication link with the UE (step S502). Then, the smallcell acquires the identity of the UE (step S504), and determines whether the identity already exists in a list (step S506). If the result is positive, the UE is identified as the target UE (step S508). If the result is negative, the smallcell then executes the determination flow shown in FIG. 3, and, as a new target UE is identified, the smallcell adds the identity of the new target UE into the list (step S510).

After identifying the target UE, the smallcell may statistically analyze the connection status of the target UE, for a reference of further optimizations. For example, the smallcell may statistically analyze at least one of: the durations the target UE stayed in a non-core region and a core region, the occurrence frequency, the amount of data traffic, and the Radio Link Failure (RLF) frequency, to obtain an analysis result and use it to adjust the transmitting power.

In an embodiment, the smallcell may adjust its transmitting power based on the ratio of the amount of data traffic of the target UE stayed in the non-core region to the total amount of data traffic. For example, when the ratio of the amount of data traffic of the target UE stayed in the non-core region to the total amount of data traffic is larger than an upper threshold, he target UE may have a larger amount of data traffic in the non-core region. In such situation, the smallcell may increase its transmitting power to ensure the network quality of service of the target UE in the non-core region. On the contrary, when the ratio of the amount of data traffic of the target UE stayed in the non-core region to the total amount of data traffic is smaller than a lower threshold, the smallcell may decrease its transmitting power.

In another embodiment, the smallcell may adjust its transmitting power based on the duration the target UE stayed in the non-core region. For example, when the duration the target UE stayed in the non-core region is larger than an upper threshold, the target UE is more likely to be located in the non-core region, so the smallcell may increase its transmitting power to maintain the network quality of service. Conversely, when the duration the target UE stayed in the non-core region is less than a lower threshold, the smallcell may decrease its transmitting power.

In another embodiment, the smallcell may determine its transmitting power based on the RLF frequency of the target UE. For example, when the RLF frequency of the target UE is larger than an upper threshold, the target UE may locate in a region with lower signal coverage strength, so the smallcell may increase its transmitting power to reduce the RLF frequency. On the contrary, when the RLF frequency of the target UE is less than a lower threshold, the smallcell may decrease its transmitting power.

In another embodiment, the smallcell may determine its transmitting power based on the amount of data traffic of a non-target UE in the set of UEs. For example, when the amount of data traffic of the non-target UE in the set of UEs is larger than an upper threshold or ratio, the smallcell may decrease its transmitting power.

To sum up, in an embodiment, the smallcell may adjust its transmitting power based on at least one of (1) the ratio of the amount of data traffic of the target UE stayed in the non-core region of the smallcell to the total amount of data traffic, (2) the time the target UE stayed in the non-core region, and (3) the RLF frequency of the target UE.

The smallcell may increase or decrease its transmitting power through a variety of power adjusting techniques. For example, the smallcell may step-up its transmitting power (e.g., increase 3 dB of power per step), and check whether the adjusted transmitting power exceeds an allowed maximum transmitting power obtained from an interference calculation. That is, the smallcell would ensure that the adjusted transmitting power is smaller than the allowed maximum transmitting power. The maximum transmitting power may be defined in, for example, 3GPP TR 36.921 7.2.3 standard, and is an allowed maximum output power selected to avoid interfering with the macrocell. Similarly, a smallcell may step-down its transmitting power (e.g., decrease 2 dB of power per step), and check whether the adjusted transmitting power is lower than a minimum transmitting power allowed by the smallcell.

Figure 6:
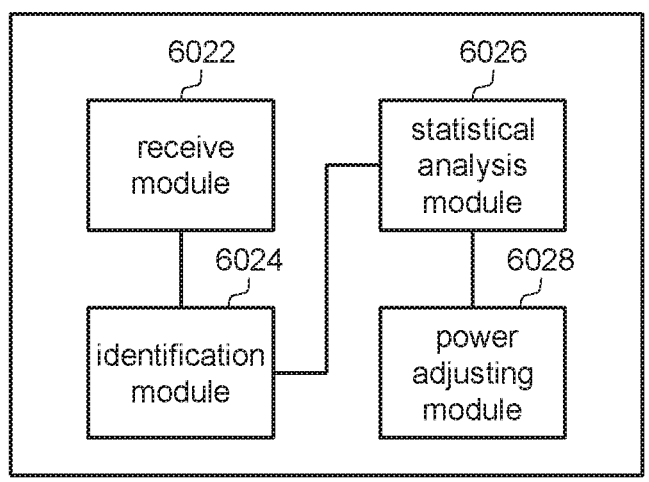
FIG. 6 shows a function block diagram of a smallcell according to an embodiment of the present invention.

FIG. 6 shows a function block diagram of a smallcell according to an embodiment of the present invention. As shown in FIG. 6, the smallcell 602 includes a receive module 6022 and an identification module 6024. In some embodiments, the smallcell 602 may further include a statistical analysis module 6026 and a power adjusting module 6028. The modules 6022, 6024, 6026, and 6028 may be realized by software, firmware, or hardware circuits, or a combination thereof. Taking the hardware circuits as example, the receive module 6022 may, for example, include radio receive circuits; the identification module 6024 and the statistical analysis module 6026 can be realized by data processing circuits; the power adjusting module 6028 may include control circuits and power output circuits. Alternatively, the modules 6022, 6024, 6026, and 6028 may be parts of a processing circuit (e.g., a processor) used for executing specific functions.

The smallcell 602 may realize the operating method in accordance with the embodiments of the present invention. As shown in FIG. 6, the receive module 6022 is configured to acquire a signal status from a set of UEs. The identification module 6024 is configured to select at least one target UE from the set of UEs based on the signal status. The statistical analysis module 6026 is configured to statistically analyze a connection status of the at least one target UE to obtain an analysis result. The power adjusting module 6028 is configured to adjust the transmitting power based on the analysis result. The operation of the modules 6022, 6024, 6026, and 6028 are corresponding to the methods and steps previously described, so it will not be described further herein.

According to the proposed smallcell and the operating method thereof, the smallcell may determine whether an UE is a target UE (i.e., a primary user, such as a family member user) based on the signal status of the UE, and may adjust the transmitting power or execute other optimization schemes based on the connection status of the target UE. Therefore, the smallcell can not only identify the primary users without using CSG settings, but also can automatically adjust relevant settings based on the usage conditions of the primary users, so as to ensure the network quality of service for each primary served user.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operating method of a smallcell, comprising:
    acquiring a signal status from a set of user equipments (UEs) in a coverage area of the smallcell;
    selecting at least one target UE from the set of UEs according to the signal status, wherein the at least one target UE is estimated as having better signal quality than remaining UE(s) in the set of UEs according to the signal status; and
    serving the at least one target UE as primary user(s) and serving the remaining UE(s) as non-primary user(s).

2. The operating method according to claim 1, further comprising:
    statistically analyzing connection status of the at least one target UE to obtain an analysis result; and
    adjusting transmitting power according to the analysis result.

3. The operating method according to claim 1, further comprising:
    selecting an UE, from the set of UEs, as the at least one target UE, wherein a signal status of the UE is equal to or better than a threshold.

4. The operating method according to claim 1, further comprising:
    storing an identity of the at least one target UE in a list; and
    comparing the list with an identity of an UE, to determine whether the identity of the UE matches that of the at least one target UE.

5. The operating method according to claim 4, further comprising:
    if the identity of the UE is not recorded in the list, and a signal status of the UE is equal to or better than a threshold, adding the identity of the UE to the list.

6. The operating method according to claim 1, wherein the coverage area of the smallcell comprises a core region and a non-core region, and the method further comprises:
    adjusting transmitting power according to at least one of:
        a ratio of an amount of data traffic of the at least one target UE stayed in the non-core region of the smallcell to a total amount of data traffic of the at least one target UE, a duration of the at least one target UE stayed in the non-core region, and a Radio Link Failure (RLF) frequency of the at least one target UE.

7. The operating method according to claim 1, further comprising:
    adjusting transmitting power according to an amount of data traffic of an UE not belonging to the at least one target UE in the set of UEs.

8. The operating method according to claim 1, wherein the signal status comprises at least one of path loss information, signal quality and signal strength.

9. A smallcell servicing a set of user equipments (UEs) within a coverage area, comprising:
    a receive module, for acquiring a signal status from the set of UEs;
    an identification module, for selecting at least one target UE from the set of UEs based on the signal status;
    wherein the at least one target UE is estimated as having better signal quality than remaining UE(s) in the set of UEs according to the signal status; and
    the at least one target UE is served as primary user(s) and the remaining UE(s) is served as non-primary user(s) by the smallcell.

10. The smallcell according to claim 9, further comprising:
    a statistical analysis module, for statistically analyzing connection status of the at least one target UE to obtain an analysis result; and
    a power adjusting module, for adjusting transmitting power according to the analysis result.

11. The smallcell according to claim 9, wherein a signal status of at least one target UE is equal to or better than a threshold.

12. The smallcell according to claim 9, wherein the identification module stores an identity of the at least one target UE in a list, and compares the list with an identity of an UE to determine whether the identity of the UE matches that of the at least one target UE.

13. The smallcell according to claim 12, wherein if the identity of the UE is not recorded in the list, and a signal status of the UE is equal to or better than a threshold, the identification module adds the identity of the UE to the list.

14. The smallcell according to claim 9, wherein the coverage area of the smallcell comprises a core region and a non-core region, and the smallcell adjusts transmitting power according to at least one of: a ratio of an amount of data traffic of the at least one target UE stayed in the non-core region of the smallcell to a total amount of data traffic of the at least one target UE, a duration of the at least one target UE stayed in the non-core region, and a Radio Link Failure (RLF) frequency of the at least one target UE.

15. The smallcell according to claim 9, wherein the smallcell adjusts transmitting power according to an amount of data traffic of an UE not belonging to the at least one target UE in the set of UEs.

16. The smallcell according to claim 9, wherein the signal status comprises at least one of path loss information, signal quality and signal strength.

* * * * *